(12) United States Patent
Dey et al.

(10) Patent No.: US 9,486,027 B2
(45) Date of Patent: Nov. 8, 2016

(54) CONNECTION ASSEMBLY FOR ADJOINING A PERIPHERAL WITH A HOST WEARABLE DEVICE

(71) Applicants: Saikat Dey, Birmingham, MI (US); Gerrit Reepmeyer, Novi, MI (US); Anupam Sengupta, Troy, MI (US); Mikhail Zharovonkov, Northville, MI (US); Senni Perumal, Southfield, MI (US); Steven Friedman, Concord, CA (US)

(72) Inventors: Saikat Dey, Birmingham, MI (US); Gerrit Reepmeyer, Novi, MI (US); Anupam Sengupta, Troy, MI (US); Mikhail Zharovonkov, Northville, MI (US); Senni Perumal, Southfield, MI (US); Steven Friedman, Concord, CA (US)

(73) Assignee: Guardhat, Inc., Southfield, MI (US)

( * ) Notice: Subject to any disclaimer, the term of this patent is extended or adjusted under 35 U.S.C. 154(b) by 0 days.

(21) Appl. No.: 15/087,972

(22) Filed: Mar. 31, 2016

(65) Prior Publication Data

US 2016/0213088 A1 Jul. 28, 2016

Related U.S. Application Data

(60) Continuation-in-part of application No. 14/883,157, filed on Oct. 14, 2015, which is a division of application No. 14/590,596, filed on Jan. 6, 2015, now Pat. No. 9,177,458, which is a division of application No. 14/517,385, filed on Oct. 17, 2014, now Pat. No. 9,013,297.

(51) Int. Cl.
*G08B 1/08* (2006.01)
*A42B 3/04* (2006.01)
*H04Q 9/00* (2006.01)

(52) U.S. Cl.
CPC ............... *A42B 3/04* (2013.01); *A42B 3/046* (2013.01); *H04Q 9/00* (2013.01)

(58) Field of Classification Search
None
See application file for complete search history.

(56) References Cited

U.S. PATENT DOCUMENTS

| | | | |
|---|---|---|---|
| 4,665,385 A | 5/1987 | Henderson | |
| 6,798,392 B2 | 9/2004 | Hartwell et al. | |
| 6,992,580 B2 | 1/2006 | Kotzin et al. | |
| 7,188,767 B2 | 3/2007 | Penuela et al. | |
| 7,298,258 B1 | 11/2007 | Hudgens et al. | |
| 7,570,170 B2 | 8/2009 | Wallner | |
| 7,592,911 B1 | 9/2009 | Hudgens et al. | |
| 7,830,249 B2 | 11/2010 | Dorneich et al. | |
| 8,040,292 B2 | 10/2011 | Ronzani et al. | |
| 8,446,273 B2 | 5/2013 | Humphrey et al. | |
| 9,101,175 B2 * | 8/2015 | Redpath ................... | A42B 3/04 |
| 2005/0001728 A1 | 1/2005 | Appelt et al. | |
| 2008/0062140 A1 | 3/2008 | Hotelling et al. | |
| 2008/0088434 A1 | 4/2008 | Frieder et al. | |
| 2008/0202251 A1 | 8/2008 | Serban et al. | |
| 2009/0126059 A1 * | 5/2009 | Tack ....................... | A42B 3/04 2/2.5 |
| 2010/0321609 A1 | 12/2010 | Qi et al. | |
| 2011/0023631 A1 | 2/2011 | Sleeman | |

(Continued)

FOREIGN PATENT DOCUMENTS

| | | |
|---|---|---|
| JP | 2009163363 | 7/2009 |
| JP | 5798700 | 10/2015 |

(Continued)

*Primary Examiner* — Travis Hunnings
(74) *Attorney, Agent, or Firm* — Simonelli IP, PLLC (57) ABSTRACT

A connection assembly for adjoining a peripheral with a host wearable device. Embodiment of the assembly can be a hardhat with an accessory connection slot allowing for both mechanical and electrical attachment of various accessories such as earphones, video display, headlamp, welder's face shield.

11 Claims, 11 Drawing Sheets

(56) References Cited

U.S. PATENT DOCUMENTS

| | | |
|---|---|---|
| 2011/0115623 A1 | 5/2011 | Gnanasekaran et al. |
| 2011/0115738 A1 | 5/2011 | Suzuki et al. |
| 2012/0038583 A1 | 2/2012 | Westhues et al. |
| 2013/0016059 A1 | 1/2013 | Lowles et al. |
| 2013/0016060 A1 | 1/2013 | Pereverzev et al. |
| 2013/0033450 A1 | 2/2013 | Coulson et al. |
| 2013/0257784 A1 | 10/2013 | Vandermeijden et al. |
| 2014/0000013 A1* | 1/2014 | Redpath .......... A42B 3/04 2/422 |
| 2014/0062934 A1 | 3/2014 | Coulson et al. |
| 2014/0078080 A1 | 3/2014 | Kim et al. |
| 2014/0210791 A1 | 7/2014 | Hanauer et al. |
| 2014/0240120 A1 | 8/2014 | Mao et al. |
| 2015/0168767 A1 | 6/2015 | Yonemura |
| 2016/0085336 A1 | 3/2016 | Kim et al. |

FOREIGN PATENT DOCUMENTS

| | | |
|---|---|---|
| KR | 200900776126 | 7/2009 |
| KR | 20100025176 | 3/2010 |
| KR | 20110039304 | 4/2011 |
| KR | 20120139518 | 12/2012 |
| KR | 20150011271 | 1/2015 |
| WO | WO2014017248 | 1/2014 |
| WO | WO2015106183 | 7/2015 |

* cited by examiner

CONNECTION ASSEMBLY FOR ADJOINING A PERIPHERAL WITH A HOST WEARABLE DEVICE

This is a continuation-in-part of U.S. patent application having Ser. No. 14/883,157, filed Oct. 14, 2015, which is a divisional of U.S. Pat. No. 9,177,458, which is a divisional of U.S. Pat. No. 9,013,297, which was filed on Oct. 17, 2014.

BACKGROUND ART

1. Field of the Invention

The invention relates generally to the field of 'smart' safety gear. More particularly, the invention relates to an accessory system for 'smart' safety devices providing mechanical connection mechanism as well as enabling data and power interchange between a peripheral and a host wearable device.

2. Description of the Related Art

In today's manufacturing environments, workers often use various accessories such as earphones, face shield, headlamp, which attached to their head worn gear or other pieces of clothing or personal protective equipment. Current accessory attachment systems provide only means of mechanically connecting peripheral and host devices. As personal protective equipment becomes 'smart,' there exist a need for a simple and universal solution that allows both mechanical and electrical connectivity of the devices.

SUMMARY OF THE INVENTION

A connection assembly adjoins a peripheral with a host wearable device. The connection assembly includes a housing secured to the host wearable device. The housing defining a receptacle. An electrical contact extends through the housing into a portion of the host wearable device.

BRIEF DESCRIPTION OF THE DRAWINGS

Advantages of the invention will be readily appreciated as the same becomes better understood by reference to the following detailed description when considered in connection with the accompanying drawings, wherein.

DETAILED DESCRIPTION OF THE PREFERRED EMBODIMENT

Workers use a connection assembly to attach various peripheral devices (e.g. headphones, welder's shield, video display, etc.) both mechanically and electrically to a host wearable device. The connection assembly is design in the way that it accommodates existing non-electrical accessories. In addition to mechanical attachment mechanism the assembly includes circuitry providing a data interface and a power interface. Such assembly will allow exchange of data (including audio and video signals) between a host wearable device and an attached 'smart' peripheral device as well as provide power to the device. Accessory connectors can be designed in the way to allow for multiple accessories connected to a single host port simultaneously (hereinafter referred to as "stacking"). Data and power interface may be compatible with industry standards for electrical connectors and communication protocols such as USB, UART, PBI, FireWire and the like. Because the host wearable device may be worn in a volatile environment, the peripherals must be secured and electrically connected to the host wearable device using a spark inhibited connection.

Figure 1:
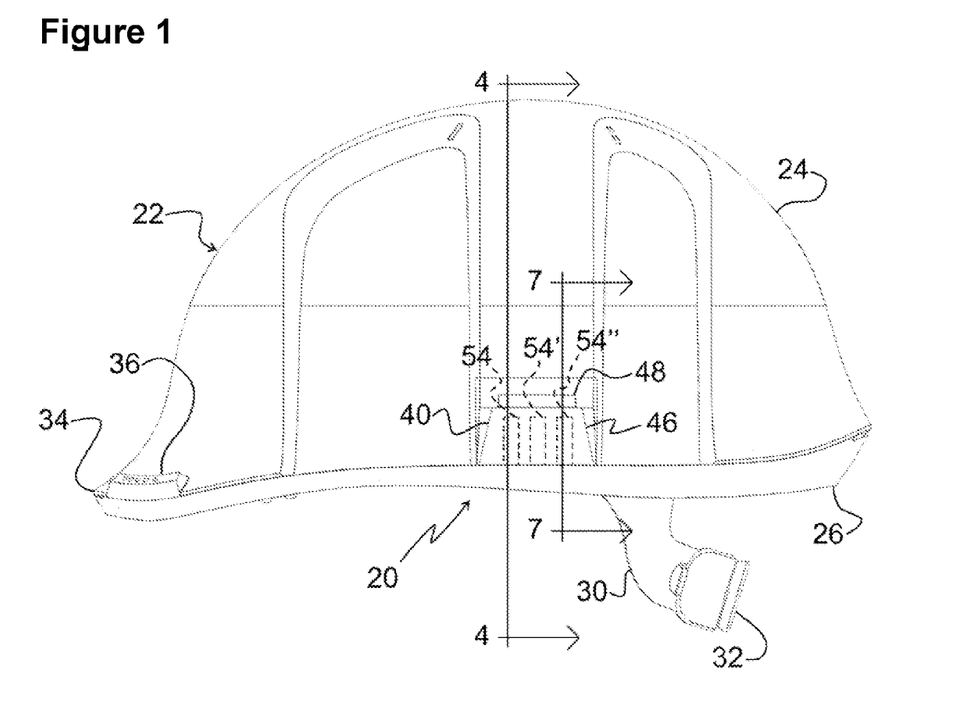
FIG. 1 is a side view of one embodiment of the invention secured to a wearable device.
Figure 2:
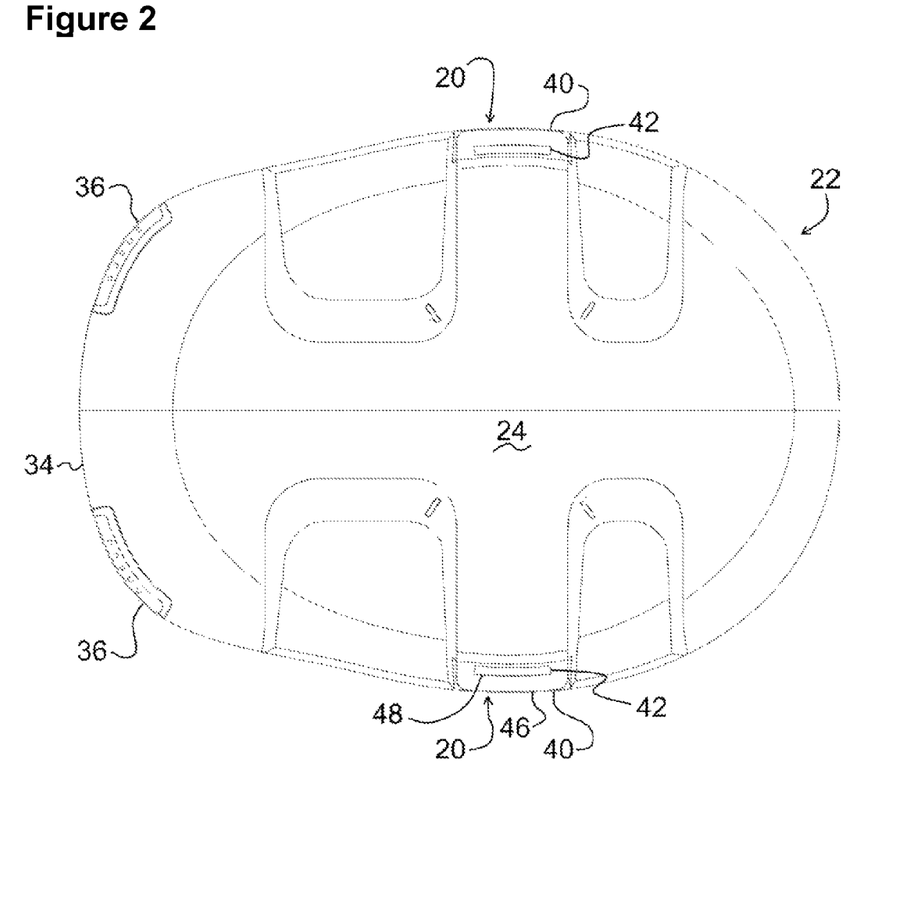
FIG. 2 is a top view the wearable device of FIG. 1.
Figure 3:
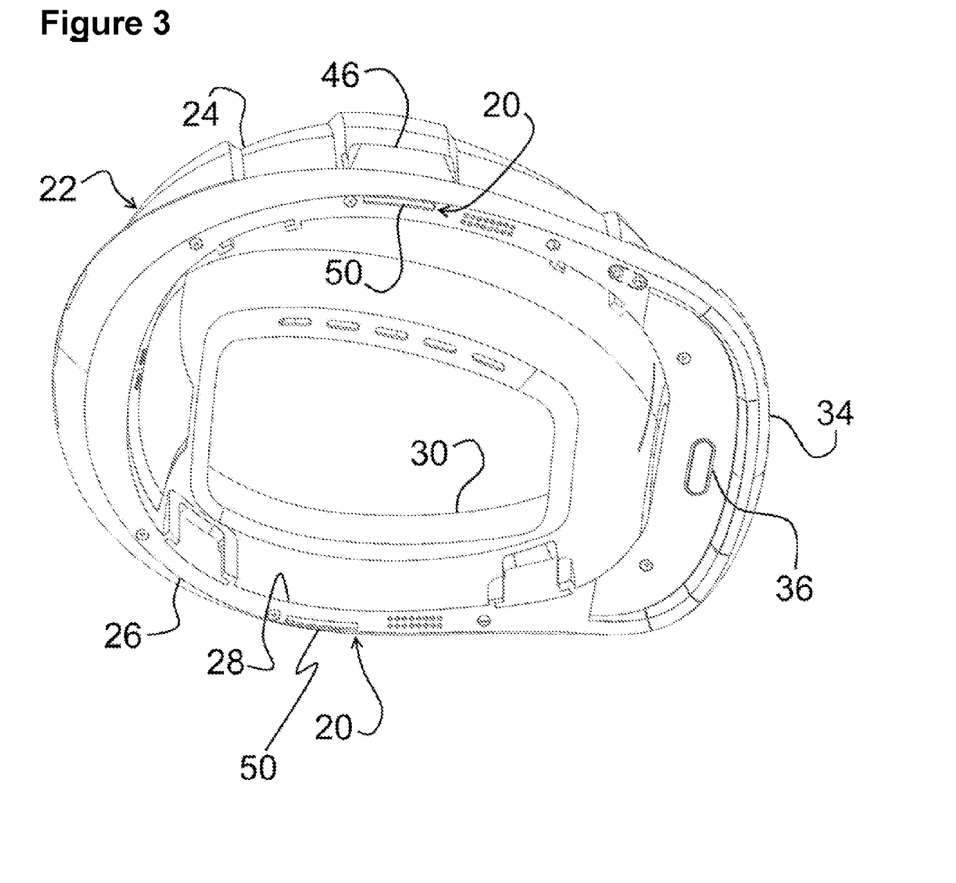
FIG. 3 is a bottom perspective view of the wearable device.

Referring to FIGS. 1 through 3, one embodiment of the invention is generally indicated at 20. The invention is a connection assembly 20 The connection assembly 20 is secured to a host wearable device, generally shown at 22. In this embodiment, the host wearable device 22 is a piece of protective head gear commonly referred to as a hard hat. It should be appreciated by those skilled in the art that the host wearable device 22 may be a vest, jacket, collar, gloves or any other device adapted to be worn by an operator.

The hard hat 22 has an outer shell 24 that is hard. The outer shell 24 is designed to cover an adult head. The outer shell 24 includes a periphery 26 that defines an opening 28 (best seen in FIG. 3). The hard hat 22 typically includes a harness 30 so that the hard hat 22 does not have to sit directly on the head of the operator. In the embodiment shown, the harness 30 has an adjuster 32 that will allow the operator to adjust the harness 32 to the proper size so that the hard hat 22 will fit on the head comfortably, yet tight enough that the hard hat 22 will not simply fall off.

The hard hat 22 also includes a visor 34 to help protect the face of the operator wearing the hard hat 22. Electronics 36 may be secured to the visor 34 or any other part of the hard hat 22. The electronics 36 connected to the hard hat are the subject of U.S. Pat. Nos. 9,013,297 and 9,177,458, the content of which is incorporated herein by reference.

In the embodiment shown in the Figures, there are two connection assemblies 20 that are secured to the host wearable device (hard hat) 22. These two connection assemblies 20 are diametrically opposite each other. In other embodiments, there may be more or less connection assemblies 20 secured to the hard hat 22, the use of more or less would depend on the environment in which the hard hat 22 is being deployed.

While it is shown that two connection assemblies 20 are secured to the hard hat 22, the remainder of the discussion will only discuss a single connection assembly 20 as the two operate identically. Each connection assembly 20 will operate the same way even though some embodiments may have different connection assemblies 20 with different configurations.

The connection assembly 20 includes a housing 40 secured to the hard hat 22. More specifically, the housing 40 is secured to the outer shell 24 of the hard hat 22. The housing 40 is fabricated from a material that is hard, like the outer shell 24. In many instances, the housing 40 will be formed integrally with the outer shell 24.

The housing 40 defines a receptacle 42. The receptacle 42 is designed to receive a peripheral adapter 44, discussed in greater detail subsequently. The receptacle 42 is a generally rectangular tube having a sidewall 46 extending vertically up a portion of the outer shell 24. The receptacle 42 has upper 48 and lower 50 apertures. The peripheral adapter 44 may be designed to be inserted into either of these openings 48, 50. In an embodiment not shown, the receptacle 42 would have a portion of its side wall 46 removed for either securing alternatively designed peripherals, or for cleaning the interior of the receptacle 42. The side wall 46 includes an inner side wall surface 52, which will be discussed in greater detail subsequently. Two guides 53, 55 are used to guide the peripheral adapter 44 into the receptacle 42. The guides 53, 55 may be simple side walls, as shown in the Figures, or they may include grooves.

The connection assembly 20 also includes an electrical contact 54. The electrical contact 54 extends along at least one interior wall 56 of the receptacle 42. The electrical contact 54 may include a plurality or set of contacts 54, 54', 54" (shown in FIG. 1), so that multiple functions may be performed through the single "point" of contact. By way of example, if the electrical contact 54 is a single contact, it may merely provide a voltage at that point. If the electrical contact is actually a set of contacts 54, 54', 54", each may supply a voltage, a data signal, and audio/video signal, respectively. Depending on the protocol and data compression used, one or more types of data may be transmitted through a single contact. Additional electrical contacts may be incorporated into the guides 53, 55, depending on the data capacity requirements.

Figure 4:
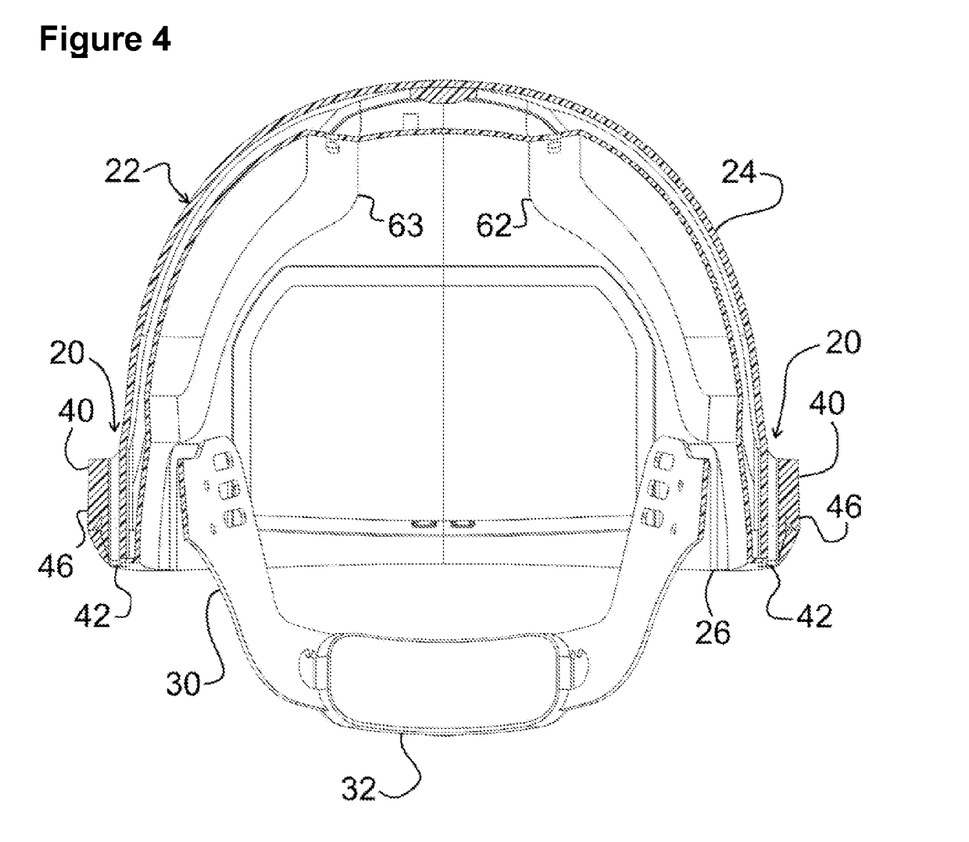
FIG. 4 is a cross-sectional view taken along lines 4-4 of FIG. 1.
Figure 5:
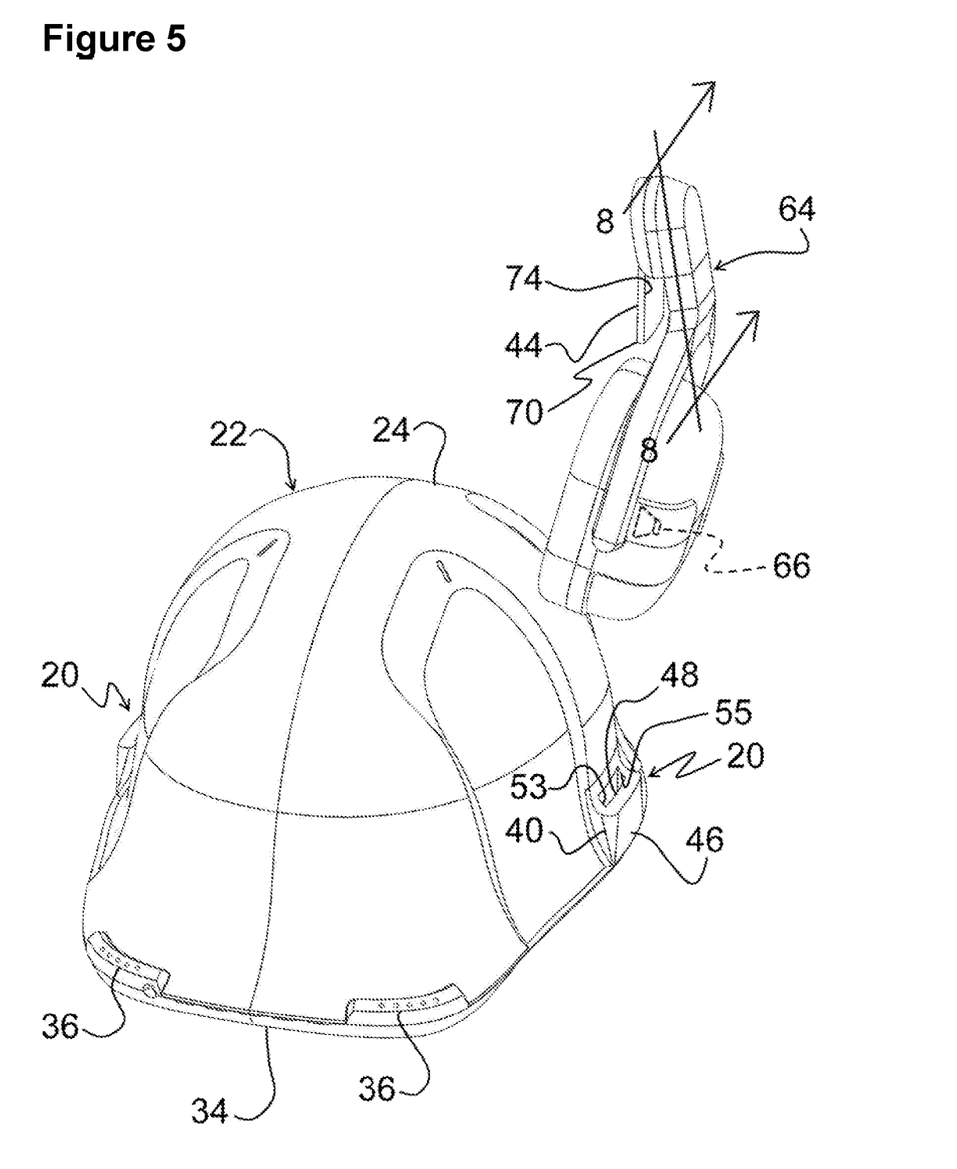
FIG. 5 is an exploded perspective view of a wearable device with an earphone accessory.
Figure 6:
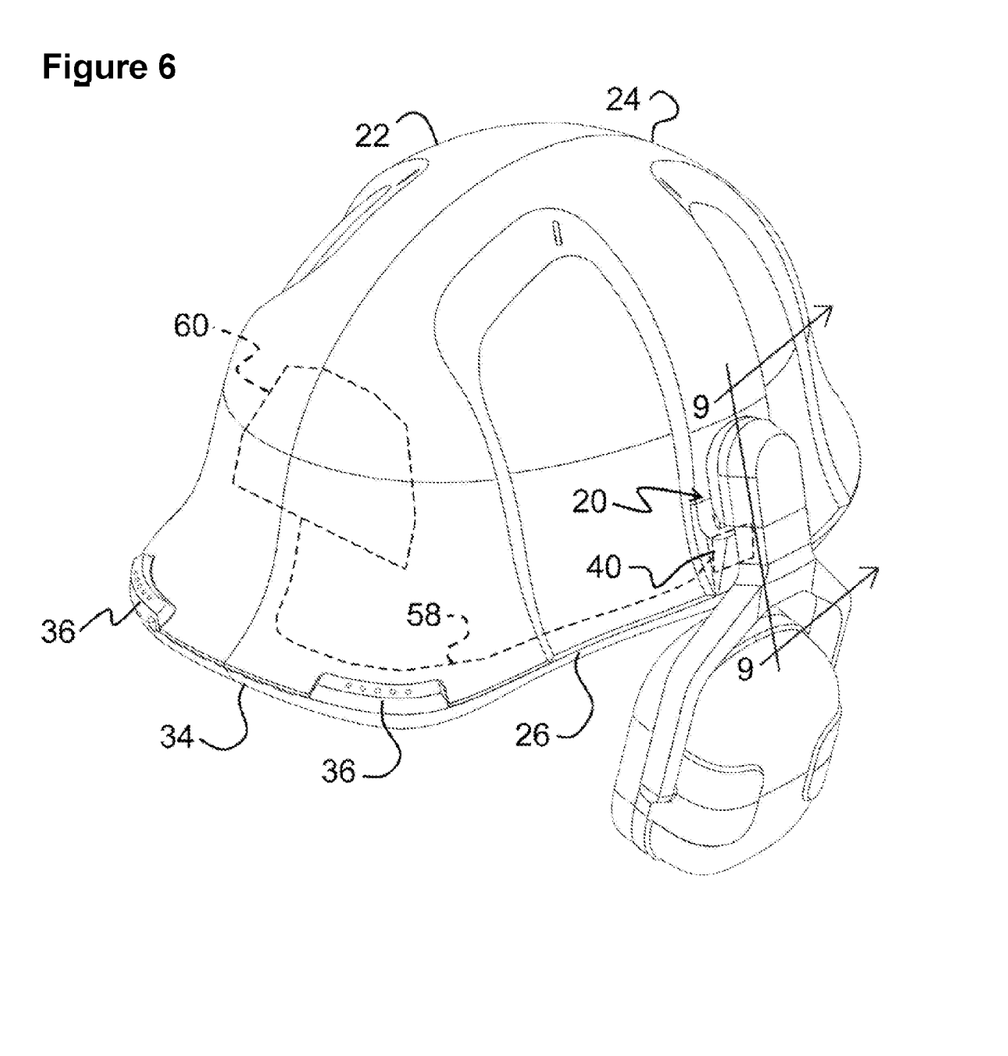
FIG. 6 is a perspective view of a wearable device with an earphone accessory secured thereto.
Figure 7:
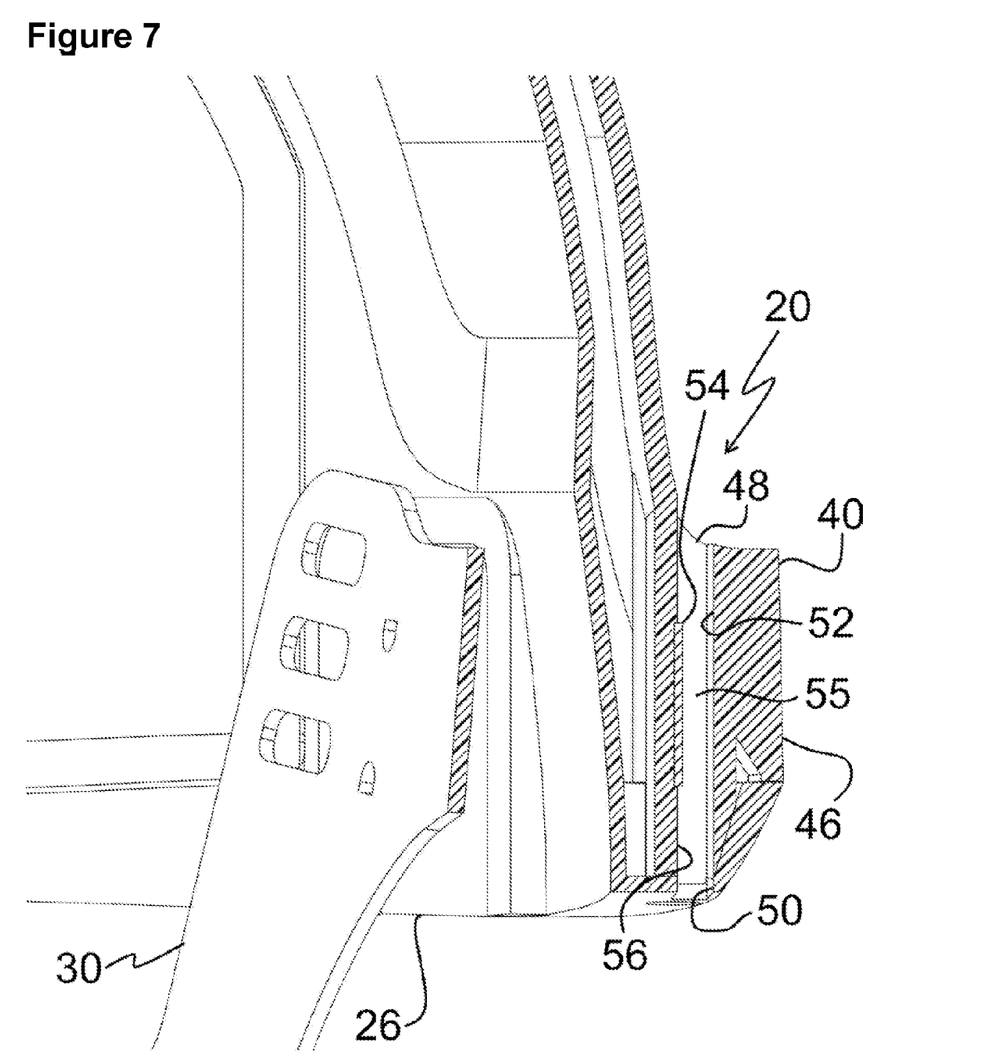
FIG. 7 is a partially cut away cross-sectional side view taken along lines 7-7 of FIG. 1.
Figure 8:
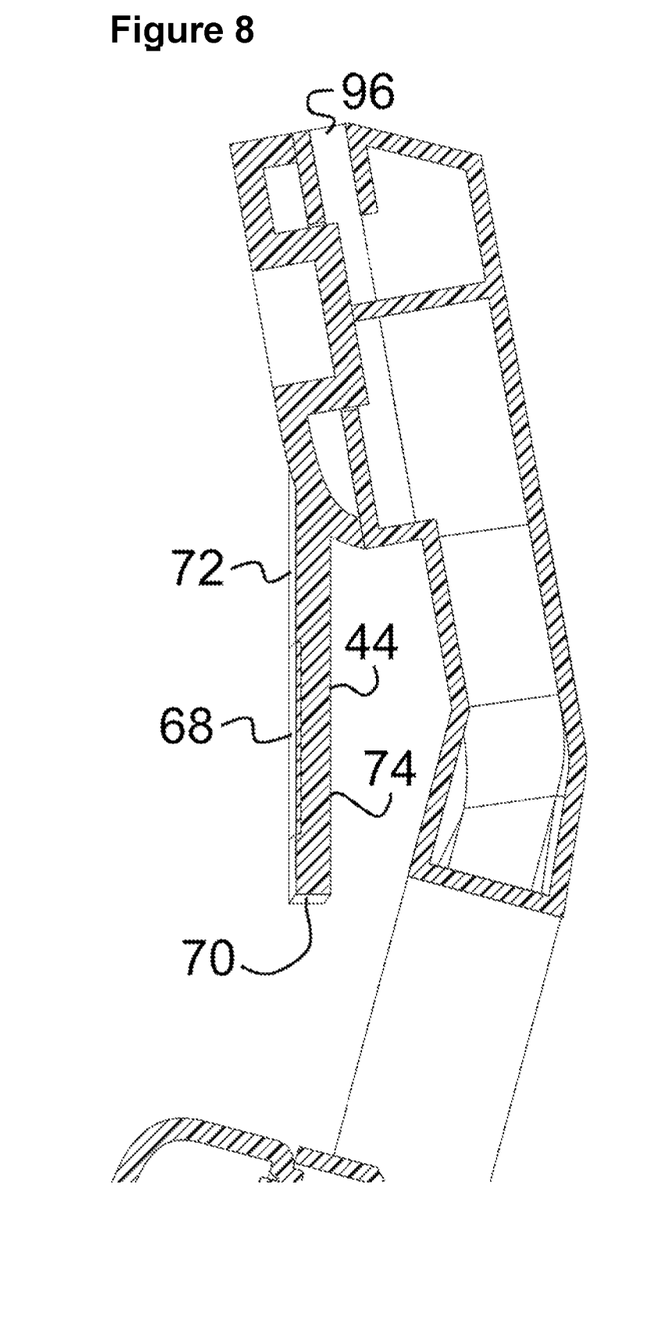
FIG. 8 is a partially cut away cross-sectional side view taken along lines 8-8 of FIG. 5.
Figure 9:
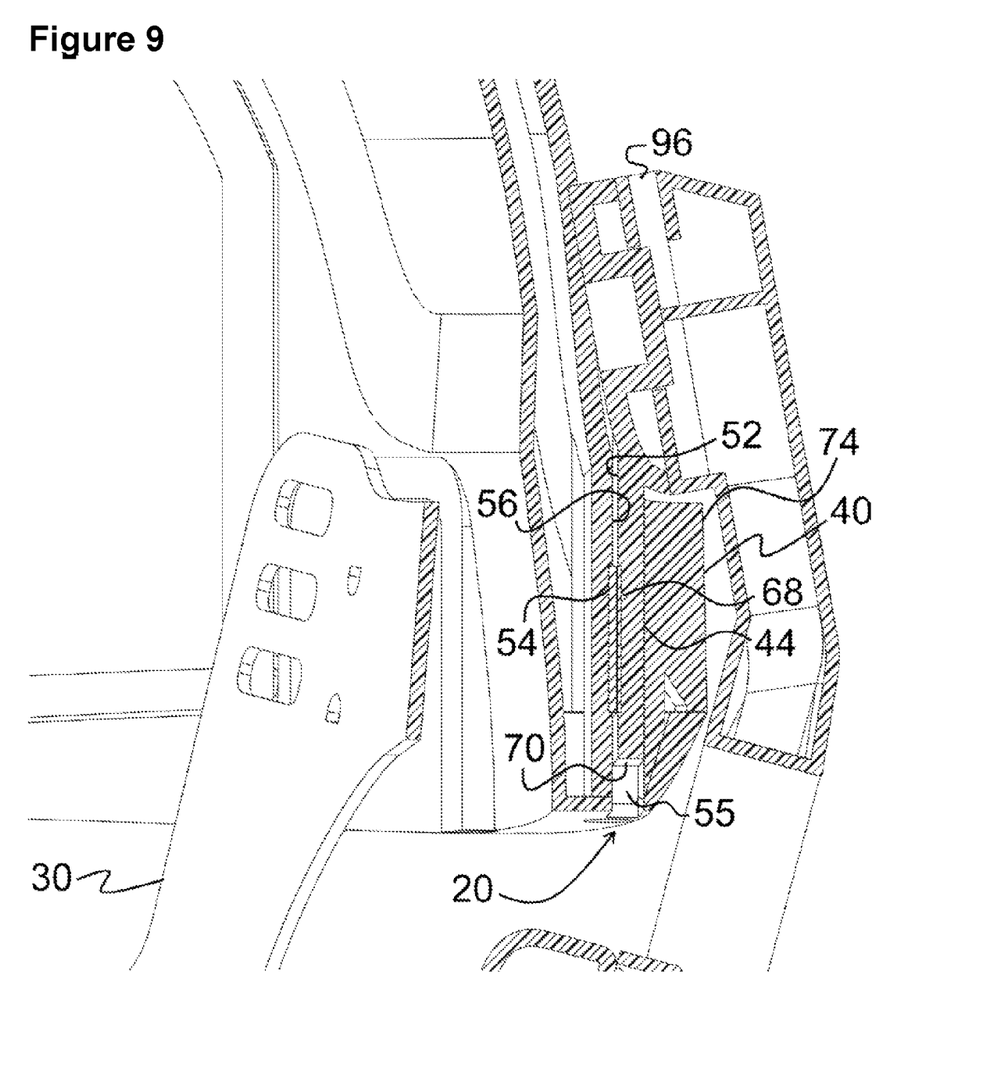
FIG. 9 is a partially cut away cross-sectional side view taken along lines 9-9 of FIG. 6.

The electrical contact 54 is electrically connected to a conductor 58, which in turn is electrically connected to a control unit 60. The control unit 60 may extend along a front of the hard hat 22, as shown in FIG. 6, or it may be housed within an electronics housing 62, as shown in FIG. 4, and supplies power (from a battery, not shown, housed within a battery housing 63) and data to and from the electrical contact 54, as well as any electronics 36 embedded in the host wearable device 22. The control unit 60 is described in greater detail in the above-mentioned United States Patents.

Referring to FIGS. 5, 6, 8 and 9, a peripheral is generally shown at 64. In these Figures, the peripheral 64 is a pair of earmuffs (only two shown in FIGS. 10 and 11). The earmuffs 64 muffle or absorb noise created in the environment to protect the ears of the operator. The earmuffs 64 also have the ability to transmit information to the operator via audio signals through a speaker 66 (shown in phantom) and they have the ability to sense information if the earmuffs 64 were so equipped. For example, the earmuffs 64 may have an ambient light sensor or an ambient temperature sensor affixed thereto. A body temperature may also be secured to the earmuffs to measure the temperature of the operator.

Figure 11:
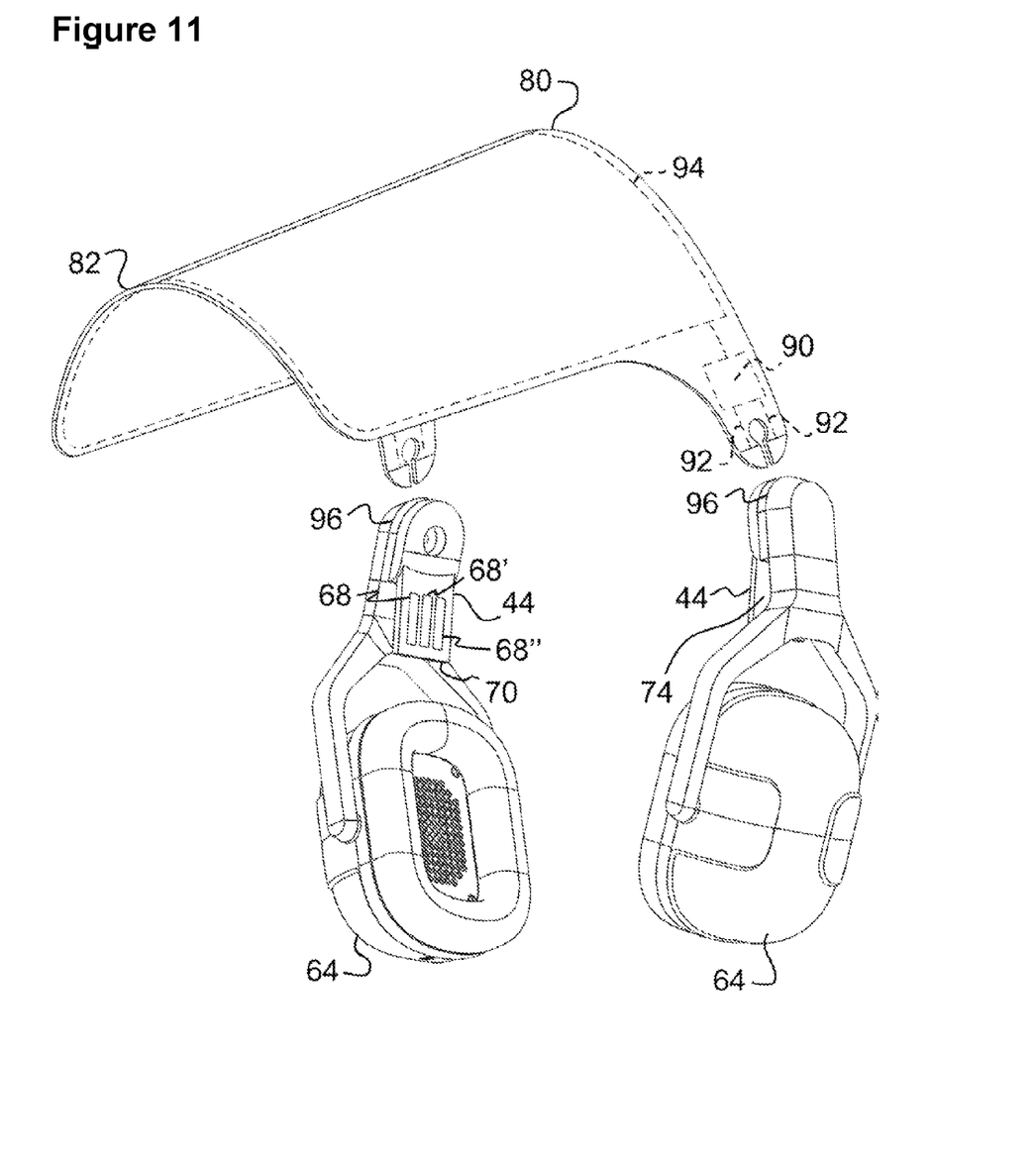
FIG. 11 is an exploded perspective view the wearable device with the second peripheral removed from the first peripheral.

Communication of these signals to and from the electrical devices (graphically represented by the microphone 66) installed in the earmuffs 64 is achieved through the peripheral adapter 44. The peripheral adapter 44 includes an adapter contact 68, which is wired through an appropriate wire harness to the electrical devices 66 hosted by the earmuffs 64. In FIG. 11, three adapter contacts 68, 68', 68" are shown to electrically connect to the three electrical contacts 54, 54', 54" of FIG. 1. The peripheral adapter 44 is designed to be inserted into the connection assembly 20. The peripheral adapter 44 extends down to a distal end 70. The peripheral adapter 44 may be shorter than the length of the receptacle 42 and, as such, may not extend therepast when fully inserted into the receptacle 42. The peripheral adapter 44 has an outboard surface 72 to which the adapter contact 68 is secured. As discussed above, there may be a set of adapter contacts 68, 68', 68" secured to the outboard surface 72 that will be in electrical contact with the set of electrical contacts 54, 54', 54" through a press fit physical contact.

The peripheral adapter 44 also includes a bias surface 74. The bias surface 74 abuts the inner sidewall surface 52 of the receptacle 42. The bias surface 74 forces adapter contact(s) 68 into engagement with the electrical contact(s) 54. Through friction, the bias surface 74 locks the peripheral adapter 44 into the connection assembly 20. This prevents the peripheral 64 from being disconnected from the hard hat 22. In an alternative embodiment, a physically distinct locking surface or relief is used to positively prevent the peripheral adapter 44 from exiting the receptacle 42.

Figure 10:
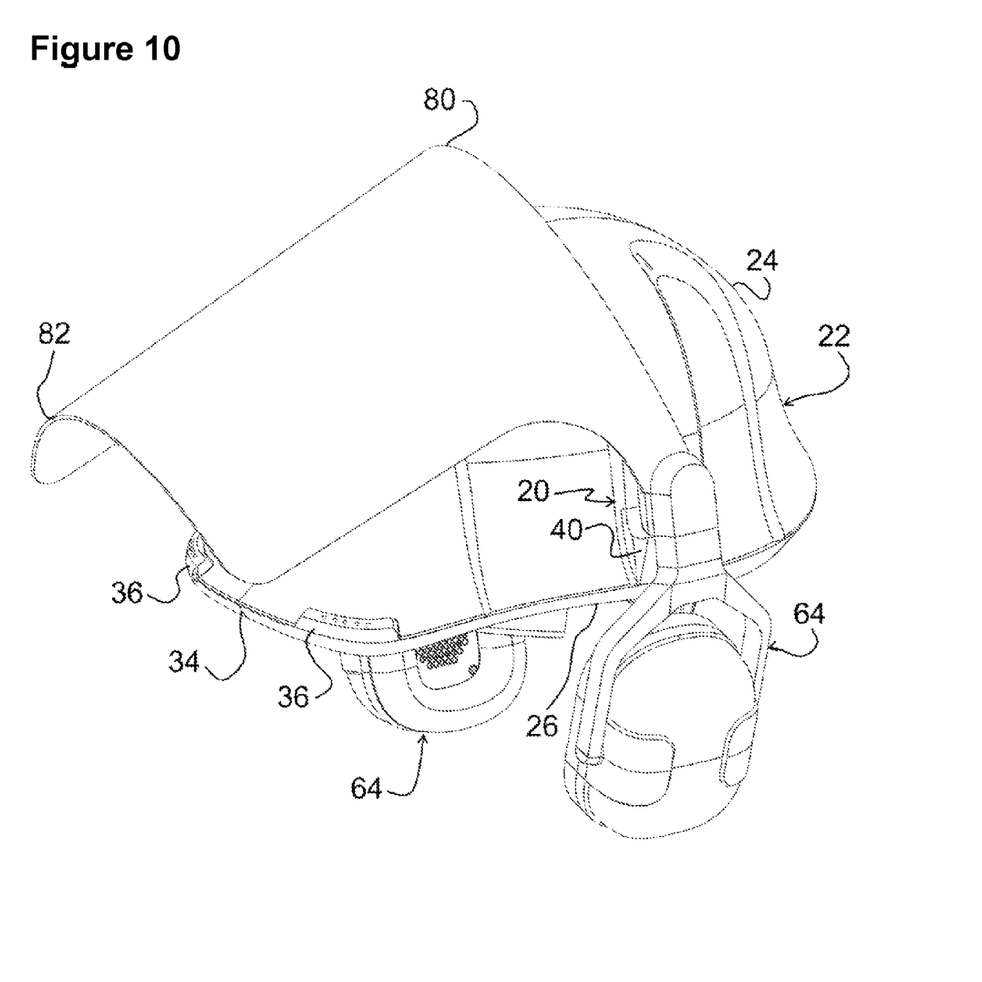
FIG. 10 is a perspective view of a wearable device with two peripherals secured thereto in a stacked relation.

Referring now to FIG. 10, the host wearable device 22 is shown with a second peripheral 80. The second peripheral 80 is a convertible face protective shield with an augmented reality display. The operator using the host wearable device 22 may move the convertible face protective shield 80 into and out of a use position depending on the job used. In FIG. 10, the convertible face protective shield 80 is not in its use position; but in a retracted position.

Referring to FIG. 11, the second peripheral 80 includes a peripheral control unit 90 that may include a power transformer, if necessary. The peripheral control unit 90 communicates with the control unit 60 through a set of adapter contacts 92 that allow power to be received thereby and to allow data to be transmitted or received therefrom. In one embodiment, the convertible face protective shield 80 would include a screen device 94 that could transmit video in a holographic or projection manner. In another instance, the screen device 94 could include a coating for the outer surface 82. The coating could be a transparent "touch screen" film allowing the operator greater communication and data bidirectional transmission freedom. The second peripheral 80 will be stacked within the first set of peripherals 64 using slots 96 designed to receive and electrically connect the second peripheral 80 therewithin. If the second peripheral 80 is not being used, caps (not shown) may be secured over the slots 96 to protect the components within the slots 96 from being damaged.

The second peripheral 80 is stacked with respect to the first peripheral 64 in that the adapter contacts of the second peripheral 80 extend along a peripheral adapter that is received by first peripheral 64, which provides an electrical connection from the second peripheral 80 to the host wearable device 22 through the connection assembly 20.

Not to be construed in a limiting manner, a list of potential peripheral devices may include: headphones, augmented reality displays, face shields, welder's visors, flashlights, visibility lights, various biometric and environmental sensors, wireless communication devices (including cell phones), microphones, CB radios, cameras, gas masks, chin straps, ear muffs, safety glasses, liners and the like.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

We claim:

1. A connection assembly for adjoining a peripheral with a host wearable device, said connection assembly comprising:
   a housing secured to the host wearable device, said housing including a receptacle defining an aperture having a periphery for a portion of the peripheral to extend through said aperture, said receptacle including a side wall extending around the entire periphery of said aperture; and
   an electrical contact extending through said housing into a portion of the host wearable device.

2. A connection assembly as set forth in claim 1 including a bias surface disposed along a portion of said housing to secure the peripheral to said housing.

3. A connection assembly as set forth in claim 1 including a second contact extends through a portion of the host wearable device and said receptacle to provide power to the peripheral.

4. A connection assembly as set forth in claim 1 wherein said receptacle includes an open end allowing access to said electrical contact.

5. A connection assembly as set forth in claim 1 wherein said receptacle includes a bias surface forcing a portion of the peripheral into contact with said electrical contact maintaining a closed circuit between said electrical contact and the peripheral as long as the peripheral within said receptacle.

6. A connection assembly as set forth in claim 4 wherein said bias surface extends at an angle with respect to said electrical contact.

7. A connection assembly as set forth in claim 3 wherein said electrical contact is a data interface.

8. A connection assembly as set forth in claim 7 wherein said second contact is a power interface.

9. A hard hat assembly comprising:
   a base ring encircling a head of a user;
   a covering extending up from the base ring to cover and protect the head;
   a connector for adjoining a peripheral to said hard hat assembly, said connector including a housing secured to said base ring, said housing defining a receptacle having four side walls that create an aperture and a bias surface disposed within said aperture for locking the peripheral to said receptacle; and
   an electrical contact extending through a portion of said hard hat assembly.

10. A hard hat assembly as set forth in claim 9 wherein said connector includes a plurality of electrical contacts allowing for multiple peripherals to be secured thereto.

11. A hard hat assembly as set forth in claim 10 including a control unit for controlling the plurality of peripherals secured to said hard hat assembly.

\* \* \* \* \*